July 13, 1926. 1,592,427
J. P. IDZAKOVICH
CHILD'S VEHICLE
Filed Oct. 24, 1925 2 Sheets-Sheet 1
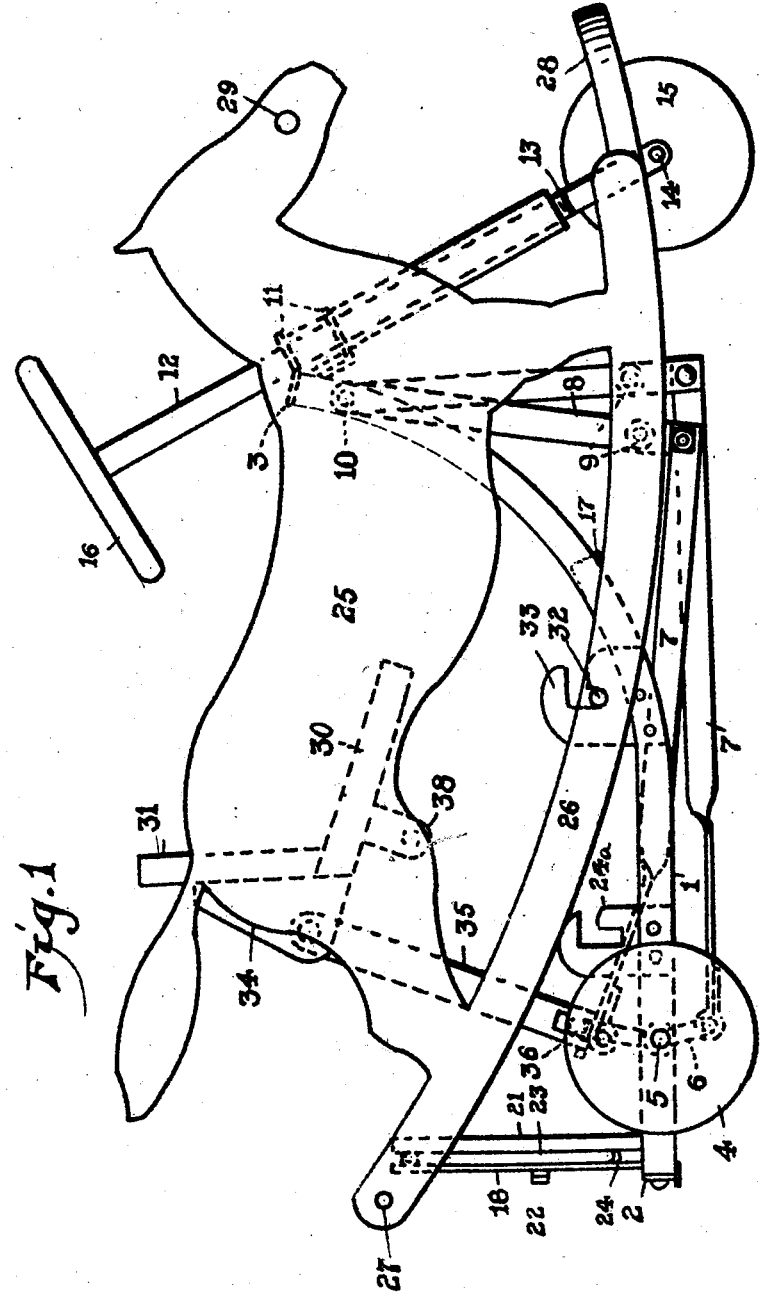
INVENTOR
John P. Idzakovich,
BY Edward A. Lawrence,
his ATTORNEY

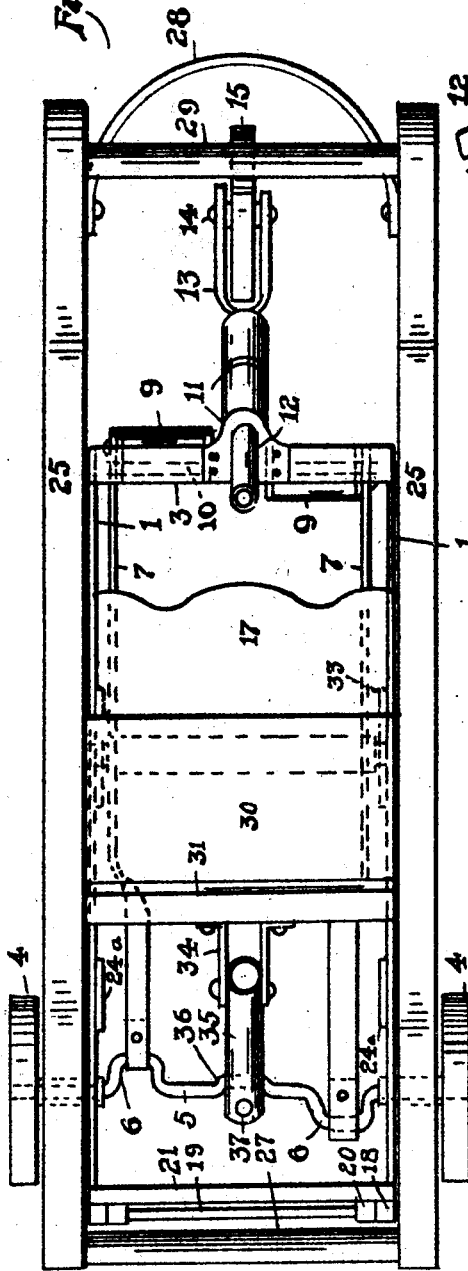

Patented July 13, 1926.

1,592,427

UNITED STATES PATENT OFFICE.

JOHN P. IDZAKOVICH, OF ETNA, PENNSYLVANIA, ASSIGNOR OF ONE-HALF TO GEORGE J. THOMAS, OF ETNA, PENNSYLVANIA.

CHILD'S VEHICLE.

Application filed October 24, 1925. Serial No. 64,554.

More particularly my invention comprises a child's vehicle consisting of a car adapted to be driven by foot-pedal mechanism and a rocking-horse which may be assembled together in one vehicle, or which may be disassembled and used separately.

When assembled into a combined vehicle, while the same is caused to travel by the foot-pedal mechanism the rocking-horse is simultaneously rocked, the occupant of the vehicle being seated in the rocking-horse seat.

In the accompanying drawings wherein I have illustrated the best embodiment of the principles of my invention now known to me, Fig. 1 is a side elevation of the combination vehicle; Fig. 2 is a plan view of the same, and Fig. 3 is a side elevation of the car, the rocking-horse having been dismounted therefrom.

Referring to the drawings, the car is shown as of the following construction. The frame is composed of side bars 1, rear end bar 2 and front end bar 3, the front bar being elevated by curving the side bars upwardly as shown in Figs. 1 and 3. The frame may be conveniently made of flat bar iron. 4 represents the rear or driving wheels of the car rigidly mounted on the extremities of an axle 5 which is journaled in suitable bearings carried by side bars 1. Inside of each of the bearings the axle is provided with a crank 6, the cranks being opposed and being connected by links 7 to the lower ends of levers 8 which are rigid with and depend from a pair of foot-pedals 9, which swing from a shaft 10 fixed between the side bars 1 below the front bar 3.

11 is a bracket extending forwardly from the center of the front bar 3 and having rotatably journaled therein a steering-post 12 which is in a forwardly and downwardly inclined position. The lower end of the post 12 is provided with a yoke 13 in which is journaled the axle 14 of the front wheel 15. The upper end of the post 12 is provided with a steering-wheel 16.

17 is a foot-board mounted between the sides 1 and stopping short of the foot pedals to provide clearance for their movement.

18 represents a pair of spaced apart posts extending up vertically from the rear bar 2 of the frame, and 19 is a rod fixed to the upper ends of said post. 20 represents a pair of metal straps whose one end is looped so as to pivotally engage the rod 19. 21 is the car seat attached to said straps and thus pivotally mounted on the rod 19.

When the combination vehicle is assembled the seat is turned down in its vertical position against the front of the posts 18, and as shown in Figs. 1 and 2 being held in place by means of pivotal clips 22 mounted on the straps 20 and turned to engage the posts.

When the rocking-horse element is removed from the vehicle and the latter is to be used as a car the seat 21 is swung up into its horizontal position shown in Fig. 3, and supported by the leg 23 formed by bending a piece of metal rod into substantially rectangular shape with one side interrupted at its center, the ends of the rods being inserted into loops 24 formed in the free ends of the straps 20. The leg 23 is thus pivotally attached to the seat, and when the seat is in its horizontal position shown in Fig. 3, said leg engages the bayonet notch in a pair of stands 24$^a$ extending upwardly from the side bars 1 of the frame. When the seat is to be lowered into its vertical position the leg 23 is disengaged from the stands and folded up under the seat, so that when the seat is lowered the leg is interposed between the seat and the post.

The rocking-horse is comprised of two side portions 25 which may be of wood or metal and which are perimetrally contoured and also painted to represent horses. Each of the members 25 is mounted by means of its legs on a rocker 26 which rockers are connected together at their rear by the cross brace 27 and at their front by the forwardly convexed metal bar 28, thus giving clearance for the front wheel. The horses' heads are also connected by the usual cross bar 29.

Between the rear of the members 25 is interposed a seat composed of a base 30 and a back-rest 31. Intermediate of their ends and approximately at their centers the rockers 26 are connected together by a round bar 32. When the elements are assembled into a combination vehicle this round bar fits down into the bayonet slots of a pair of stands 33 extending upwardly from the side bars 1 of the frame, thus mounting the rocking-horse on the car in such a manner that the frame may oscillate or rock on the latter.

34 represents a pair of spaced apart brackets attached to the rear of the backrest 31 and having pivotally connected between them the upper end of a connecting rod 35 whose lower end is slotted upwardly to receive the crank 36 formed on the center of the axle 5. The slot in the lower end of the rod 35 is closed by means of a bolt or cotter pin 37 inserted through registering holes in the bifurcated end of the rod, thus completing the bearing of the crank.

When the elements of the vehicle are to be disassembled said bolt or pin is removed and the rod disengaged from the crank and swung upwardly toward the base of the rocking-horse seat between a pair of lugs 38, the lower ends of said lugs being pierced so that the bolt or cotter pin may be inserted through the same to hold the rod out of the way. The rocking-horse may then be lifted off the car and may be set on the floor and used as an ordinary rocking-horse.

It is apparent that when the rocking-horse element and the car element are assembled together a child may occupy the seat and work the pedals, thus simultaneously causing the car to travel and the rocking-horse to rock or oscillate.

When the rocking-horse is removed from the car and the seat of the latter raised to its elevated position as shown in Fig. 3, the child may sit upon said seat and cause the car to travel by operating the pedals.

It is apparent from the foregoing that my invention provides a most attractive toy vehicle for children.

What I desire to claim is:

1. In a child's vehicle, the combination of a car, a seat on said car, a rocking-horse, means whereby the horse may be detachably mounted on said car to rock relative therewith, a seat in said horse, and means whereby said car seat may be retracted out of the way to give clearance for said horse.

2. The combination for a child's vehicle of a wheel car provided with driving means and a rocking-horse each arranged for separate use, and connections whereby the rocking-horse may be detachably mounted on the car and be caused to rock by the travel of the car.

3. The combination for a child's vehicle of a wheel car provided with pedal driving means and a rocking-horse each arranged for separate use, and connections whereby the rocking-horse may be detachably mounted on the car and be caused to rock by the travel of the car.

4. The combination for a child's vehicle of a wheel car provided with oscillating pedal-driving means and a rocking-horse each arranged for separate use, and connections whereby the rocking-horse may be detachably mounted on the car and be caused to rock by the travel of the car.

Signed at Etna this 21st day of October 1925.

JOHN P. IDZAKOVICH.